United States Patent
Low

(10) Patent No.: US 9,249,271 B2
(45) Date of Patent: Feb. 2, 2016

(54) ETHYLENE-BASED POLYMER COMPOSITIONS AND FOAMS

(71) Applicant: Dow Global Technologies LLC, Midland, MI (US)

(72) Inventor: Bee Tin Low, Singapore (SG)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/419,541

(22) PCT Filed: Mar. 4, 2013

(86) PCT No.: PCT/US2013/028861
§ 371 (c)(1),
(2) Date: Feb. 4, 2015

(87) PCT Pub. No.: WO2014/035467
PCT Pub. Date: Mar. 6, 2014

(65) Prior Publication Data
US 2015/0218331 A1  Aug. 6, 2015

Related U.S. Application Data

(60) Provisional application No. 61/694,287, filed on Aug. 29, 2012.

(51) Int. Cl.
| | |
|---|---|
| C08L 23/00 | (2006.01) |
| C08J 9/00 | (2006.01) |
| C08L 47/00 | (2006.01) |
| C08L 53/00 | (2006.01) |
| C08L 23/08 | (2006.01) |
| C08L 23/16 | (2006.01) |

(52) U.S. Cl.
CPC ............. *C08J 9/0061* (2013.01); *C08L 23/08* (2013.01); *C08L 23/0815* (2013.01); *C08L 23/16* (2013.01); *C08L 47/00* (2013.01); *C08L 53/00* (2013.01); *C08J 2323/08* (2013.01); *C08J 2323/16* (2013.01); *C08J 2353/00* (2013.01); *C08L 2203/14* (2013.01); *C08L 2205/025* (2013.01); *C08L 2207/064* (2013.01)

(58) Field of Classification Search
None
See application file for complete search history.

(56) References Cited

U.S. PATENT DOCUMENTS

| | | |
|---|---|---|
| 5,272,236 A | 12/1993 | Lai et al. |
| 5,278,272 A | 1/1994 | Lai et al. |
| 5,288,762 A | 2/1994 | Park et al. |
| 5,932,659 A * | 8/1999 | Bambara et al. ............. 525/240 |
| 6,221,964 B1 | 4/2001 | Brzoskowski et al. |
| 6,325,956 B2 | 12/2001 | Chaudhary et al. |
| 6,340,717 B1 | 1/2002 | Hargarten et al. |
| 6,359,073 B1 * | 3/2002 | Babb et al. ................... 525/194 |
| 6,384,096 B1 | 5/2002 | Ladang et al. |
| 6,767,931 B2 | 7/2004 | Martinez et al. |
| 7,557,147 B2 | 7/2009 | Martinez et al. |
| 7,858,706 B2 | 12/2010 | Arriola et al. |
| 2001/0002075 A1 * | 5/2001 | Chaudhary et al. ............. 264/51 |
| 2004/0039075 A1 | 2/2004 | Sahnoune et al. |
| 2004/0142405 A1 | 7/2004 | Alfonta et al. |
| 2005/0267261 A1 * | 12/2005 | Plaver .......................... 525/191 |
| 2006/0199872 A1 | 9/2006 | Prieto et al. |
| 2006/0199911 A1 | 9/2006 | Markovich et al. |
| 2006/0211819 A1 | 9/2006 | Hoenig et al. |
| 2008/0207786 A1 | 8/2008 | Suzuki et al. |

FOREIGN PATENT DOCUMENTS

| | | |
|---|---|---|
| EP | 0426346 A2 | 5/1991 |
| EP | 0470701 A2 | 2/1992 |
| WO | 2004/009698 A2 | 1/2004 |
| WO | 2010/040019 A2 | 4/2010 |
| WO | 2011/079207 | 6/2011 |
| WO | 2011/163176 | 12/2011 |

OTHER PUBLICATIONS

PCT/US2013/028861, 20130515, International Search Report and Written Opinion.
PCT/US2013/028861, 20150303, International Preliminary Report on Patentability.

* cited by examiner

*Primary Examiner* — Kara Boyle

(57) ABSTRACT

The invention provides a composition comprising the following: A) a first polymer selected from the following: i) an ethylene/α-olefin interpolymer; or ii) an ethylene/α-olefin multi-block interpolymer; B) a second polymer selected from the following: iii) an ethylene/α-olefin interpolymer; iv) an ethylene/α-olefin/non-conjugated diene interpolymer; or v) an ethylene/α-olefin multi-block interpolymer; and wherein the first polymer has a density from 0.880 to 0.910 g/cc, and the second polymer has a density less than, or equal to, 0.867 g/cc, and wherein the weight ratio of the first polymer to the second polymer is from 0.5 to 9.

15 Claims, 1 Drawing Sheet

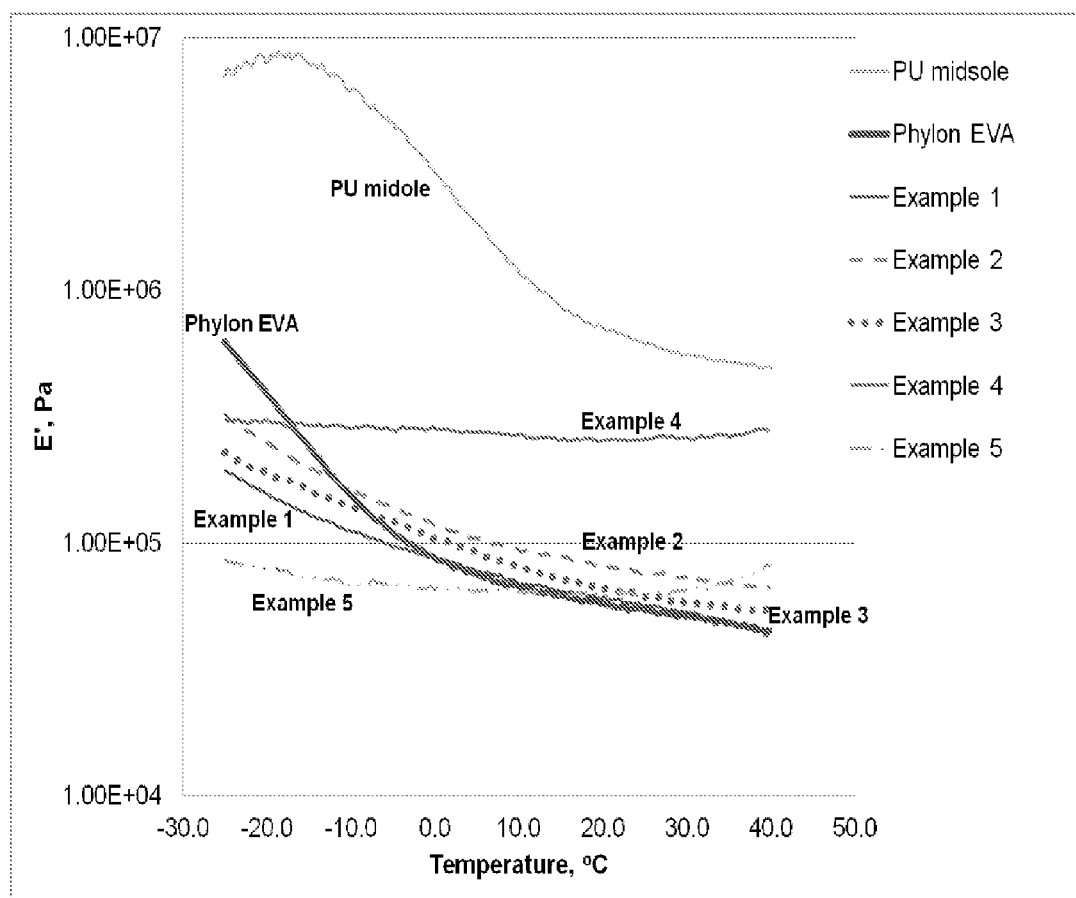

ETHYLENE-BASED POLYMER COMPOSITIONS AND FOAMS

REFERENCE TO RELATED APPLICATIONS

The present application claims the benefit of U.S. Provisional Application No. 61/694,287, filed Aug. 29, 2012.

BACKGROUND OF THE INVENTION

Cross-linked, closed-cell, foams formed from polyurethane (PU), ethylenevinyl acetate (EVA), or EVA/ethylene-alpha-olefin copolymer blends are commonly used for midsoles in footwear applications. The function of the midsole is mainly cushioning, which helps to distribute, and soften, the force of impact when feet hit the ground. However, the dynamic properties of PU- and EVA-based foams change with temperature. These foams become too hard during cold weather, which results in less cushioning effects. There is a need for new foam compositions that provide consistent dynamic properties (for example, constant storage modulus (E')) over a broad range of temperature, as compared to incumbent EVA- and PU-based foams.

International Publication WO 2011/079207 discloses a composition comprising at least the following: A) an ethylene/α-olefin/polyene interpolymer, B) an ethylene/α-olefin copolymer, C) optionally at least one filler, D) at least one crosslinking agent, and E) at least one blowing agent. The absolute difference in the solubility parameters between the polymer components is less than, or equal to, 0.15 $(cal/cm^3)^{1/2}$.

U.S. Publication 2006/0211819 discloses polymer blends comprises the following: 1) at least one ethylene/α-olefin interpolymer and 2) at least one polyolefin, or at least one styrenic block copolymer, or a combination thereof. Such polyolefins include, but are not limited to, high melt strength, high density polyethylene, and high melt strength polypropylene. The ethylene/α-olefin interpolymers are random block copolymers, comprising at least a hard block and at least a soft block. The polyolefins can be homopolymers or interpolymers.

U.S. Publication 2008/0207786 discloses an ethylene-propylene-diene rubber foamed material, obtained by foaming a rubber composition containing an ethylene-propylene-diene rubber, a quinoid cross-linking agent, and an organic peroxide cross-linking agent.

U.S. Publication 2006/0199872 discloses foamable compositions and foams, comprising at least an ethylene/α-olefin interpolymer. The foam has a density from greater than 150 to about 500 $kg/m^3$. The foamable compositions further comprise a blowing agent and a crosslinking agent. The ethylene/α-olefin interpolymer is a multi-block copolymer comprising at least one soft block and at least one hard block.

U.S. Publication 2006/0199911 discloses a polymer composition comprising at least an ethylene/α-olefin interpolymer and at least one other polymer. The other polymer can be selected from a second ethylene/α-olefin interpolymer, an elastomer, a polyolefin, a polar polymer, and an ethylene/carboxylic acid interpolymer or ionomer thereof. The ethylene/α-olefin interpolymer is a block copolymer having at least a hard block and at least a soft block.

Additional polymer formulations are disclosed in the following references; U.S. Pat. Nos. 5,288,762, 6,221,964, 6,325,956, 6,340,717, 6,384,096, 6,767,931, 7,557,147; U.S. Publications 2004/0039075, 2004/0142405; International Publications WO 2011/163176, and WO 2010/040019.

However, as discussed above, there remains a need for new foam compositions that provide consistent dynamic properties (for example, constant storage modulus (E')) over a broad range of temperature, as compared to incumbent EVA- and PU-based foams. These needs have been met by the following invention.

SUMMARY OF THE INVENTION

The invention provides a composition comprising the following:
A) a first polymer selected from the following:
  i) an ethylene/α-olefin interpolymer; or
  ii) an ethylene/α-olefin multi-block interpolymer;
B) a second polymer selected from the following:
  iii) an ethylene/α-olefin interpolymer;
  iv) an ethylene/α-olefin/non-conjugated diene interpolymer; or
  v) an ethylene/α-olefin multi-block interpolymer; and
wherein the first polymer has a density from 0.880 to 0.910 g/cc, and the second polymer has a density less than, or equal to, 0.867 g/cc, and wherein the weight ratio of the first polymer to the second polymer is from 0.5 to 9.

BRIEF DESCRIPTION OF THE DRAWINGS

FIG. 1 is a plot of "storage modulus (E') versus temperature" for inventive and comparative foams.

DETAILED DESCRIPTION OF THE INVENTION

Applicant has discovered that the inventive compositions can be used to form foams that have consistent dynamic properties over a broad range of temperature, and (ii) an elastic relaxation (measured as compression set at 50° C.) lower than 40%, which makes these materials better than the incumbent EVA- and PU-based foam over a wider temperature range.

As discussed above, the invention provides a composition comprising the following:
A) a first polymer selected from the following:
  i) an ethylene/α-olefin interpolymer, and further an ethylene/α-olefin copolymer; or
  ii) an ethylene/α-olefin multi-block interpolymer, and further an ethylene/α-olefin multi-block copolymer;
B) a second polymer selected from the following:
  iii) an ethylene/α-olefin interpolymer, and further an ethylene/α-olefin copolymer;
  iv) an ethylene/α-olefin/non-conjugated diene interpolymer; or
  v) an ethylene/α-olefin multi-block interpolymer, and further an ethylene/α-olefin multi-block copolymer; and
    wherein the first polymer has a density from 0.880 to 0.910 g/cc, and the second polymer has a density less than, or equal to, 0.867 g/cc, and wherein the weight ratio of the first polymer to the second polymer is from 0.5 to 9.

An inventive composition may comprise a combination of two or more embodiments as described herein.

In one embodiment, the weight ratio of the first polymer to the second polymer is from 0.5 to 7, further from 0.6 to 4, and further from 0.7 to 2.3.

In one embodiment, the first polymer has a density from 0.882 to 0.910 g/cc, further from 0.885 to 0.910 g/cc, and further from 0.890 to 0.910 g/cc (1 cc=1 $cm^3$).

In one embodiment, the first polymer has a melt index (I2) from 0.1 to 50 g/10 min, further from 0.5 to 20 g/10 min, further from 1 to 10 g/10 min, and further from 1 to 7 g/10 min.

In one embodiment, the second polymer has a density from 0.855 to 0.867 g/cc, further from 0.860 to 0.867 g/cc, and further from 0.863 to 0.867 g/cc (1 cc=1 cm$^3$).

In one embodiment, the second polymer has a melt index (I2) from 0.1 to 20 g/10 min, further from 0.2 to 10 g/10 min, and further from 0.4 to 5 g/5 min.

In one embodiment, the second polymer has a melt index (I2) less than, or equal to, 5 g/10 min, further less than, or equal to, 2 g/10 min.

In one embodiment, the second polymer has a melt index (I2) greater than, or equal to, 0.1 g/10 min, further greater than, or equal to, 0.2 g/10 min.

In one embodiment, the first polymer has a melting temperature (Tm) greater than 70° C., as determined by DSC.

In one embodiment, the first polymer has a melting temperature (Tm) less than 130° C., as determined by DSC.

In one embodiment, the first polymer has a molecular weight distribution (Mw/Mn) from 1.2 to 3.

In one embodiment, the first polymer is i) an ethylene/α-olefin interpolymer, and further an ethylene/α-olefin copolymer.

In one embodiment, i) the ethylene/α-olefin interpolymer, and further ethylene/α-olefin copolymer, has a melting temperature (Tm) greater than 60° C., further greater than 70° C., and further greater than 80° C., as determined by DSC.

In one embodiment, i) the ethylene/α-olefin interpolymer, and further ethylene/α-olefin copolymer, has a melting temperature (Tm) less than 120° C., further less than 110° C., and further less than 100° C., as determined by DSC.

In one embodiment, i) the ethylene/α-olefin interpolymer, and further ethylene/α-olefin copolymer, has a molecular weight distribution (Mw/Mn) from 1.2 to 3.5, further from 1.5 to 3.0, and further from 1.7 to 2.5.

In one embodiment, i) the ethylene/α-olefin interpolymer, and further ethylene/α-olefin copolymer, is a homogeneously branched linear ethylene/α-olefin interpolymer, or a homogeneously branched substantially linear ethylene/α-olefin interpolymer.

In one embodiment, i) the ethylene/α-olefin interpolymer is a homogeneously branched linear ethylene/α-olefin interpolymer.

In one embodiment, i) the ethylene/α-olefin interpolymer is a homogeneously branched substantially linear ethylene/α-olefin interpolymer.

In one embodiment, i) the ethylene/α-olefin copolymer is a homogeneously branched substantially linear ethylene/α-olefin copolymer.

In one embodiment, i) the ethylene/α-olefin copolymer is a homogeneously branched linear ethylene/α-olefin copolymer.

In one embodiment, the first polymer is ii) an olefin block interpolymer, and further an olefin block copolymer.

In one embodiment, the second polymer has a molecular weight distribution (Mw/Mn) from 1.2 to 3.

In one embodiment, the second polymer is iii) an ethylene/α-olefin interpolymer, and further an ethylene/α-olefin copolymer.

In one embodiment, iii) the ethylene/α-olefin interpolymer, and further ethylene/α-olefin copolymer, has a molecular weight distribution (Mw/Mn) from 1.2 to 3.5, further from 1.5 to 3.0, and further from 1.7 to 2.5.

In one embodiment, iii) the ethylene/α-olefin interpolymer, and further ethylene/α-olefin copolymer, has a melting temperature (Tm) greater than 20° C., further greater than 30° C., and further greater than 40° C., as determined by DSC.

In one embodiment, iii) the ethylene/α-olefin interpolymer, and further ethylene/α-olefin copolymer, has a melting temperature (Tm) less than 80° C., further less than 70° C., and further less than 60° C., as determined by DSC.

In one embodiment, iii) the ethylene/α-olefin interpolymer is a homogeneously branched linear ethylene/α-olefin interpolymer, or a homogeneously branched substantially linear ethylene/α-olefin interpolymer.

In one embodiment, iii) the ethylene/α-olefin interpolymer is a homogeneously branched linear ethylene/α-olefin interpolymer.

In one embodiment, iii) the ethylene/α-olefin interpolymer is a homogeneously branched substantially linear ethylene/α-olefin interpolymer.

In one embodiment, iii) the ethylene/α-olefin copolymer is a homogeneously branched linear ethylene/α-olefin copolymer, or a homogeneously branched substantially linear ethylene/α-olefin copolymer.

In one embodiment, iii) the ethylene/α-olefin copolymer is a homogeneously branched linear ethylene/α-olefin copolymer.

In one embodiment, iii) the ethylene/α-olefin copolymer is a homogeneously branched substantially linear ethylene/α-olefin copolymer.

In one embodiment, the second polymer is iv) an ethylene/α-olefin/non-conjugated diene interpolymer.

In one embodiment, iv) the ethylene/α-olefin/non-conjugated diene interpolymer has a Mooney Viscosity (ML 1+4) at 125° C., from 5 to 70, further from 10 to 60, and further from 15 to 50.

In one embodiment, iv) the ethylene/α-olefin/non-conjugated diene interpolymer has a Mooney Viscosity (ML 1+4) at 125° C., from 5 to 50, further from 10 to 40, and further from 15 to 30.

In one embodiment, the second polymer is v) an olefin block interpolymer, and further an olefin block copolymer.

In one embodiment, the composition comprising the following: Ai) an ethylene/α-olefin interpolymer, and further a copolymer; and B) a second polymer selected from the following:
  iii) an ethylene/α-olefin interpolymer, and further a copolymer;
  iv) an ethylene/α-olefin/non-conjugated diene interpolymer; or
  v) an ethylene/α-olefin multi-block interpolymer, and further a copolymer.

In one embodiment, the composition comprising the following: Ai) an ethylene/α-olefin interpolymer, and further a copolymer; and B) a second polymer selected from the following:
  iii) an ethylene/α-olefin interpolymer, and further a copolymer; or
  iv) an ethylene/α-olefin/non-conjugated diene interpolymer.

In one embodiment, the composition comprising the following: Ai) an ethylene/α-olefin interpolymer, and further a copolymer; and B) a second polymer selected from the following:
  iii) an ethylene/α-olefin interpolymer, and further a copolymer; or
  v) an ethylene/α-olefin multi-block interpolymer, and further a copolymer.

In one embodiment, the composition comprising the following: Ai) an ethylene/α-olefin interpolymer, and further a copolymer; and B) a second polymer selected from the following:
  iv) an ethylene/α-olefin/non-conjugated diene interpolymer; or
  v) an ethylene/α-olefin multi-block interpolymer, and further a copolymer.

In one embodiment, the composition comprising the following: Aii) an ethylene/α-olefin multi-block interpolymer, and further a copolymer; and B) a second polymer selected from the following:
  iii) an ethylene/α-olefin interpolymer, and further a copolymer;
  iv) an ethylene/α-olefin/non-conjugated diene interpolymer; or
  v) an ethylene/α-olefin multi-block interpolymer, and further a copolymer.

In one embodiment, the composition comprising the following: Aii) an ethylene/α-olefin multi-block interpolymer, and further a copolymer; and B) a second polymer selected from the following:
  iii) an ethylene/α-olefin interpolymer, and further a copolymer; or
  iv) an ethylene/α-olefin/non-conjugated diene interpolymer.

In one embodiment, the composition comprising the following: Aii) an ethylene/α-olefin multi-block interpolymer, and further a copolymer; and B) a second polymer selected from the following:
  iii) an ethylene/α-olefin interpolymer, and further a copolymer; or
  v) an ethylene/α-olefin multi-block interpolymer, and further a copolymer.

In one embodiment, the composition comprising the following: Aii) an ethylene/α-olefin multi-block interpolymer, and further a copolymer; and B) a second polymer selected from the following:
  iv) an ethylene/α-olefin/non-conjugated diene interpolymer; or
  v) an ethylene/α-olefin multi-block interpolymer, and further a copolymer.

In one embodiment, the composition further comprises a free radical agent and a foaming agent.

In one embodiment, Component A is present in an amount from 40 to 90 weight percent, further from 40 to 80 weight percent, and further from 40 to 70 weight percent, and Component B is present in an amount from 60 to 10 weight percent, further from 60 to 20 weight percent, and further from 60 to 30 weight percent, and wherein the weight percentages of Components A and B are each based on the sum weight of Components A and B.

In one embodiment, Component A is present in an amount from 50 to 80 weight percent, further from 55 to 80 weight percent, and Component B is present in an amount from 50 to 20 weight percent, further from 45 to 20 weight percent, and wherein the weight percentages of Components A and B are each based on the sum weight of Components A and B.

In one embodiment, Component A is present in an amount from 50 to 70 weight percent, further from 55 to 70 weight percent, and Component B is present in an amount from 50 to 30 weight percent, further from 45 to 30 weight percent, and wherein the weight percentages of Components A and B are each based on the sum weight of Components A and B.

In one embodiment, the composition comprises greater than, or equal to, 50 weight percent components A and B, based on the weight of the composition.

In one embodiment, the composition comprises greater than, or equal to, 70 weight percent components A and B, based on the weight of the composition.

In one embodiment, the composition comprises greater than, or equal to, 80 weight percent components A and B, based on the weight of the composition.

In one embodiment, the composition comprises greater than, or equal to, 88 weight percent components A and B, based on the weight of the composition.

In one embodiment, the composition comprises less than 5 weight percent, further less than 2 weight percent, and further less than 1 weight percent, of a propylene-based polymer, based on the weight of the composition.

In one embodiment, the composition does not contain a propylene-based polymer.

In one embodiment, the composition comprises less than 5 weight percent, further less than 2 weight percent, and further less than 1 weight percent, of a polypropylene homopolymer, based on the weight of the composition.

In one embodiment, the composition does not contain a polypropylene homopolymer.

In one embodiment, the composition comprises less than 2 weight percent, further less than 1 weight percent, further less than 0.5 weight percent, and further less than 0.1 weight percent, of an oil, based on the weight of the composition.

In one embodiment, the composition does not contain an oil.

In one embodiment, the composition comprises less than 5 weight percent, further less than 2 weight percent, and further less than 1 weight percent, of an acrylic-modified polytetrafluoroethylene, based on the weight of the composition.

In one embodiment, the composition does not contain an acrylic-modified polytetrafluoroethylene.

In one embodiment, the composition does not contain a poly(sulfonyl azide).

An inventive composition may comprise a combination of two or more embodiments as described herein.

The first polymer of Component A may comprise a combination of two or more embodiments as described herein.

The second polymer of Component B may comprise a combination of two or more embodiments as described herein.

The invention also provides a foam formed from an inventive composition described herein. In a further embodiment, the foam has a density from 150 to 400 kg/m$^3$, further from 200 to 350 kg/m$^3$, and further from 250 to 300 kg/m$^3$.

The invention also provides a crosslinked composition formed from an inventive composition described herein.

The invention also provides an article comprising at least one component formed from an inventive composition described herein.

The invention also provides a process to form a foam, said process comprising extruding an inventive composition described herein.

An inventive composition may comprise a combination of two or more embodiments as described herein.

An inventive foam may comprise a combination of two or more embodiments as described herein.

An inventive crosslinked composition may comprise a combination of two or more embodiments as described herein.

An inventive article may comprise a combination of two or more embodiments as described herein.

An inventive process may comprise a combination of two or more embodiments as described herein.

First Ethylene-Based Polymer (Component A)

The first ethylene-based polymer is an ethylene/α-olefin interpolymer, and further an ethylene/α-olefin copolymer, or an ethylene/α-olefin multi-block interpolymer, and further a copolymer.

Ethylene/α-Olefin Interpolymers (Component A)

Ethylene/α-olefin interpolymers include polymers formed by polymerizing ethylene with one or more, and preferably one, C3-C10 α-olefin(s). Illustrative α-olefins include propylene, 1-butene, 1-pentene, 1-hexene, 4-methyl-1-pentene, 1-heptene, 1-octene, 1-nonene and 1-decene. Preferably, the α-olefin is propylene, 1-butene, 1-hexene or 1-octene. Preferred copolymers include ethylene/propylene (EP) copolymers, ethylene/butene (EB) copolymers, ethylene/hexene (EH) copolymers, ethylene/octene (EO) copolymers.

Commercial examples of suitable ethylene/α-olefin interpolymers include ENGAGE Polyolefin Elastomers available from The Dow Chemical Company; EXCEED and EXACT polymers available from ExxonMobil Chemical Company; and TAFMER polymers available from the Mitsui Chemical Company.

In one embodiment, the ethylene/α-olefin interpolymer, and further a copolymer, has a melting point (Tm) greater than 40° C. preferably greater than 50° C., more preferably greater than 60° C., as determined by DSC.

In one embodiment, the ethylene/α-olefin interpolymer, and further a copolymer, has a melting point (Tm) less than 120° C., preferably less than 110° C., and more preferably less than 100° C., as determined by DSC.

In one embodiment, the ethylene/α-olefin interpolymer, and further a copolymer, has a density greater than, or equal to, 0.868 g/cc, further greater than, or equal to, 0.870 g/cc, further greater than, or equal to, 0.875 g/cc.

In one embodiment, the ethylene/α-olefin interpolymer, and further a copolymer, has a density less than, or equal to, 0.910 g/cc, further less than, or equal to, 0.905 g/cc, add further less than, or equal to, 0.900 g/cc.

In one embodiment, the ethylene/α-olefin interpolymer, and further a copolymer, has a melt index (I2) greater than, or equal to, 0.1 g/10 min, further greater than, or equal to, 0.2 g/10 min, add further greater than, or equal to, 0.5 g/10 min.

In one embodiment, the ethylene/α-olefin interpolymer, and further a copolymer, has a melt index (I2) less than, or equal to, 50 g/10 min, further less than, or equal to, 20 g/10 min, and further less than, or equal to, 10 g/10 min.

In one embodiment, the ethylene/α-olefin interpolymer, and further a copolymer, has a melt index (I2) from 0.1 g/10 min to 50 g/10 min, further from 0.2 g/10 min to 20 g/10 min, add further from 0.5 g/10 min to 10 g/10 min.

In one embodiment, the ethylene/α-olefin interpolymer, and further a copolymer, has molecular weight distribution (Mw/Mn) from 1.2 to 3.5, further from 1.5 to 3.0, and further from 1.7 to 2.5, as determined by GPC.

In one embodiment, the ethylene/α-olefin interpolymer, and further a copolymer, has a percent crystallinity of less than, or equal to, 50 percent, further less than, or equal to, 40 percent, and further less than, or equal to, 30 percent, as measured by DSC.

In one embodiment, the ethylene/α-olefin interpolymer, and further a copolymer, has a percent crystallinity of greater than, or equal to, 2 percent, further greater than, or equal to, 5 percent, and further greater than, or equal to, 10 percent, as measured by DSC.

In one embodiment, the ethylene/α-olefin interpolymer, and further ethylene/α-olefin copolymer, has a melting temperature (Tm) greater than 60° C., further greater than 70° C., and further greater than 80° C., as determined by DSC.

In one embodiment, the ethylene/α-olefin interpolymer, and further ethylene/α-olefin copolymer, has a melting temperature (Tm) less than 120° C., further less than 110° C., and further less than 100° C., as determined by DSC.

In one embodiment, the ethylene/α-olefin interpolymer is a homogeneously branched linear interpolymer, and further a copolymer, or a homogeneous branched substantially linear interpolymer, and further a copolymer.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio. See discussion below.

In one embodiment, the ethylene/α-olefin interpolymer, and further copolymer, is a homogeneously branched linear interpolymer, and further copolymer.

In one embodiment, the ethylene/α-olefin interpolymer, and further copolymer, is a homogeneous branched substantially linear interpolymer, and further copolymer.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. No. 4,701,432; U.S. Pat. No. 4,937,301; U.S. Pat. No. 4,935,397; U.S. Pat. No. 5,055,438; and WO 90/07526; each incorporated herein by reference. As discussed, the homogeneously branched linear ethylene interpolymers lack long chain branching, just as is the case for the linear low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone. For example, see U.S. Pat. Nos. 5,272,236; 5,278,272; each incorporated herein by reference.

The substantially linear ethylene/α-olefin interpolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076, 698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene/α-olefin interpolymers useful in the invention have excellent processability, even though they have a relatively narrow molecular weight distribution. Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

The ethylene/α-olefin interpolymer may comprise a combination of two or more embodiments as described herein.

The ethylene/α-olefin copolymer may comprise a combination of two or more embodiments as described herein.

Ethylene/α-Olefin Multi-Block Interpolymers (Component A)

In one embodiment, the first polymer is an ethylene/α-olefin multi-block interpolymer, and further an ethylene/α-olefin multi-block copolymer.

In a preferred embodiment, the ethylene/α-olefin multi-block interpolymer, and further an ethylene/α-olefin multi-block copolymer, comprises a majority amount of polymerized ethylene, based on the weight of the polymer.

The term "olefin block copolymer" or "OBC" means an ethylene/α-olefin multi-block copolymer and includes ethylene and one or more copolymerizable α-olefin comonomer in polymerized form, characterized by multiple blocks or segments of two or more polymerized monomer units differing in chemical or physical properties. When referring to amounts of "ethylene" or "comonomer" in the copolymer, it is understood that this means polymerized units thereof. In some embodiments, the multi-block copolymer can be represented by the following formula:

$(AB)_n$, where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB.

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the olefin block copolymer may comprise 50 mol % to 90 mol % ethylene, preferably 60 mol % to 85 mol %, more preferably 65 mol % to 80 mol %. For many ethylene/octene block copolymers, the preferred composition comprises an ethylene content greater than 80 mole percent of the whole polymer and an octene content of from 10 to 15, preferably from 15 to 20 mole percent of the whole polymer.

The olefin block copolymer includes various amounts of "hard" and "soft" segments. "Hard" segments are blocks of polymerized units in which ethylene is present in an amount greater than 95 weight percent, or greater than 98 weight percent based on the weight of the polymer, up to 100 weight percent. In other words, the comonomer content (content of monomers other than ethylene) in the hard segments is less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an OBC from 1 weight percent to 99 weight percent of the total weight of the OBC, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Cohn L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The olefin block copolymer is a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a polydispersity index, PDI (or MWD), from 1.7 to 3.5, or from 1.8 to 3, or from 1.8 to 2.5, or from 1.8 to 2.2. When produced in a batch or semi-batch process, the OBC possesses PDI from 1.0 to 3.5, or from 1.3 to 3, or from 1.4 to 2.5, or from 1.4 to 2.

In addition, the olefin block copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present olefin block copolymer possesses a most probable distribution of block lengths. In an embodiment, the olefin block copolymer is defined as having:

(A) Mw/Mn from 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from 1.7 to 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299 \Delta H + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; and/or, (E) has a storage modulus at 25° C., G' (25° C.), and a storage modulus at 100° C., G'(100° C.), wherein the ratio of G' (25° C.) to G' (100° C.) is in the range of 1:1 to 9:1.

The olefin block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3. It is understood that the olefin block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

The ethylene/α-olefin multi-block interpolymer, and further copolymer, may comprise any one of properties (A) through (G), or may comprises a combination of two or more of (A) through (G).

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydro-naphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

The olefin block copolymers can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. No. 7,608,668; U.S. Pat. No. 7,893,166; and U.S. Pat. No. 7,947,793.

In one embodiment, the ethylene/α-olefin multi-block interpolymer, and further copolymer, has a density of less than, or equal to, 0.910 g/cc, further less than, or equal to, 0.905 g/cc, further less than, or equal to, 0.900 g/cc, and further less than, or equal to, 0.885 g/cc.

In one embodiment, the ethylene/α-olefin multi-block interpolymer, and further copolymer, has a density greater than, or equal to, 0.882 g/cc, further greater than, or equal to, 0.885 g/cc, and further greater than, or equal to, 0.887 g/cc. Density is measured by the procedure of ASTM D-792-08.

In one embodiment, the ethylene/α-olefin multi-block interpolymer, and further copolymer, has a melting point of greater than 90° C., further greater than 100° C. The melting point is measured by Differential Scanning calorimetry (DSC) method described in U.S. Publication 2006/0199930 (WO 2005/090427), incorporated herein by reference.

In one embodiment, the ethylene/α-olefin multi-block interpolymer, and further copolymer, has a melt index (I2) greater than, or equal to, 0.1 g/10 min, further greater than, or equal to, 0.5 g/10 min, and further greater than, or equal to, 1 g/10 min, as determined using ASTM D-1238 (190° C., 2.16 kg load).

In one embodiment, the ethylene/α-olefin multi-block interpolymer, and further copolymer, has a melt index (I2) less than, or equal to, 50 g/10 min, further less than, or equal to, 20 g/10 min, and further less than, or equal to, 10 g/10 min, as determined using ASTM D-1238 (190° C., 2.16 kg load).

An ethylene/α-olefin multi-block interpolymer may comprise a combination of two or more embodiments as described herein.

An ethylene/α-olefin multi-block copolymer may comprise a combination of two or more embodiments as described herein.

Second Ethylene-Based Polymer (Component B)

The second ethylene-based polymer is an ethylene/α-olefin interpolymer, and further a copolymer, or an ethylene/α-olefin/diene interpolymer, or an or an ethylene/α-olefin multi-block interpolymer, and further a copolymer.

Ethylene/α-Olefin Interpolymers (Component B)

Ethylene/α-olefin interpolymers, further copolymers, include polymers formed by polymerizing ethylene with one or more, and preferably one, C3-C10 α-olefin(s). Illustrative α-olefins include propylene, 1-butene, 1-pentene, 1-hexene, 4-methyl-1-pentene, 1-heptene, 1-octene, 1-nonene and 1-decene. Preferably, the α-olefin is propylene, 1-butene, 1-hexene or 1-octene. Preferred copolymers include ethylene/propylene (EP) copolymers, ethylene/butene (EB) copolymers, ethylene/hexene (EH) copolymers, ethylene/octene (EO) copolymers.

Commercial examples of suitable ethylene/α-olefin interpolymers include ENGAGE Polyolefin Elastomers available from The Dow Chemical Company; EXCEED and EXACT polymers available from ExxonMobil Chemical Company; and TAFMER polymers available from the Mitsui Chemical Company.

In one embodiment, the ethylene/α-olefin interpolymer, further copolymer, has a melting point (Tm) greater than 20° C. further greater than 30° C., and further greater than 40° C., as determined by DSC.

In one embodiment, the ethylene/α-olefin interpolymer, further copolymer, has a melting point (Tm) less than 70° C., further less than 80° C., and further less than 60° C., as determined by DSC.

In one embodiment, the ethylene/α-olefin interpolymer, further copolymer, has a density greater than, or equal to, 0.850 g/cc, further greater than, or equal to, 0.855 g/cc, and further greater than, or equal to, 0.860 g/cc.

In one embodiment, the ethylene/α-olefin interpolymer, further copolymer, has a density less than, or equal to, 0.867 g/cc, further less than, or equal to, 0.866 g/cc, and further less than, or equal to, 0.865 g/cc.

In one embodiment, the ethylene/α-olefin interpolymer, further copolymer, has a melt index (I2) greater than, or equal to, 0.1 g/10 min, further greater than, or equal to, 0.2 g/10 min, and further greater than, or equal to, 0.4 g/10 min.

In one embodiment, the ethylene/α-olefin interpolymer, further copolymer, has a melt index (I2) less than, or equal to, 10 g/10 min, further less than, or equal to, 5 g/10 min, and further less than, or equal to, 2 g/10 min.

In one embodiment, the ethylene/α-olefin interpolymer, further copolymer, has a melt index (I2) from 0.1 g/10 min to 10 g/10 min, further from 0.2 g/10 min to 5 g/10 min, and further from 0.4 g/10 min to 2 g/10 min.

In one embodiment, the ethylene/α-olefin interpolymer, further copolymer, has molecular weight distribution (Mw/Mn) from 1.2 to 3.5, further from 1.5 to 3.0, and further from 1.7 to 2.5, as determined by GPC.

In one embodiment, the ethylene/α-olefin interpolymer, further copolymer, has a percent crystallinity of less than, or equal to, 30 percent, further less than, or equal to, 20 percent, and further less than, or equal to, 15 percent, as measured by DSC.

In one embodiment, the ethylene/α-olefin interpolymer, further copolymer, has a percent crystallinity of greater than, or equal to, 1 percent, further greater than, or equal to, 2 percent as measured by DSC.

In one embodiment, the ethylene/α-olefin interpolymer, further copolymer, is a homogeneously branched linear copolymer, or a homogeneous branched substantially linear interpolymer, further copolymer.

In one embodiment, the ethylene/α-olefin interpolymer, further copolymer, is a homogeneously branched linear interpolymer, further copolymer.

In one embodiment, the ethylene/α-olefin interpolymer, further copolymer, is a homogeneously branched substantially linear interpolymer, further copolymer.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio. See discussion above.

An ethylene/α-olefin interpolymer may comprise a combination of two or more embodiments as described herein.

An ethylene/α-olefin copolymer may comprise a combination of two or more embodiments as described herein.

Ethylene/α-Olefin/Diene Interpolymers (Component B)

The ethylene/α-olefin/diene interpolymers comprise, in polymerized form, C2 (ethylene), at least one α-olefin and a diene. Suitable examples of α-olefins include the C3-C20 α-olefins. Suitable examples of suitable dienes include the C4-C40 non-conjugated dienes.

The α-olefin is preferably a C3-C20 α-olefin, preferably a C3-C16 α-olefin, and more preferably a C3-C10 α-olefin. Preferred C3-C10 α-olefins are selected from the group consisting of propylene, 1-butene, 1-hexene and 1-octene, and more preferably propylene. In a preferred embodiment, the interpolymer is an EPDM interpolymer. In a further embodiment, the diene is 5-ethylidene-2-norbornene (ENB).

In one embodiment, the diene is a C6-C15 straight chain, branched chain or cyclic hydrocarbon diene. Illustrative non-conjugated dienes are straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The diene is preferably a non-conjugated diene selected from ENB, dicyclopentadiene, 1,4-hexadiene, or 7-methyl-1,6-octadiene, and preferably, ENB, dicyclopentadiene or 1,4-hexadiene, more preferably ENB or dicyclopentadiene, and even more preferably ENB.

Some examples of ethylene/α-olefin/diene interpolymers include the NORDEL IP Hydrocarbon Rubbers from The Dow Chemical Company.

In one embodiment, the ethylene/α-olefin/diene interpolymer comprises a majority amount of polymerized ethylene, based on the weight of the interpolymer.

In one embodiment of the invention, the ethylene/α-olefin/diene interpolymer has a molecular weight distribution (Mw/Mn) from 2.0 to 8.0, further from 2.0 to 5.0 and more further from 2.0 to 4.0, and even more further from 2.0 to 3.5. In a further embodiment, the interpolymer is an EPDM terpolymer. In a further embodiment, the diene is ENB.

In one embodiment, the ethylene/α-olefin/diene interpolymer has a Mooney viscosity, ML(1+4) at 125° C., greater than 5, further greater than 10, and further greater than 15. In a further embodiment, the interpolymer is an EPDM terpolymer. In a further embodiment, the diene is ENB.

In one embodiment, the ethylene/α-olefin/diene interpolymer has a Mooney viscosity, ML(1+4) at 125° C., less than 70, further less than, or equal to, 60, and further less than, or equal to, 50. In a further embodiment, the interpolymer is an EPDM terpolymer. In a further embodiment, the diene is ENB.

Mooney viscosity is that of the neat interpolymer (or calculated viscosity of neat polymer for polymers that contain a filler, such as carbon black, and/or an oil). The neat polymer refers to the polymer without filler and without oil.

In one embodiment, the ethylene/α-olefin/diene interpolymer has a polyene content from 0.5 to 5 weight percent, based on the weight of the interpolymer. In a further embodiment, the interpolymer is an EPDM terpolymer. In a further embodiment, the diene is ENB.

In one embodiment, the ethylene/α-olefin/diene interpolymer has a density greater than, or equal to, 0.850 g/cc, further greater than, or equal to, 0.855 g/cc, and further greater than, or equal to, 0.860 g/cc. In a further embodiment, the interpolymer is an EPDM terpolymer. In a further embodiment, the diene is ENB.

In one embodiment, the ethylene/α-olefin interpolymer/diene has a density less than, or equal to, 0.867 g/cc, further less than, or equal to, 0.865 g/cc, and further less than, or equal to, 0.863 g/cc. In a further embodiment, the interpolymer is an EPDM terpolymer. In a further embodiment, the diene is ENB.

In one embodiment, the ethylene/α-olefin/diene interpolymer has a Mn from 10,000 to 250,000 g/mole, further from 10,000 to 75,000 g/mole. In a further embodiment, the interpolymer is an EPDM terpolymer. In a further embodiment, the diene is ENB.

In one embodiment, the ethylene/α-olefin/diene interpolymer has a Mw from 100,000 to 500,000 g/mole, further from 100,000 to 150,000 g/mole. In a further embodiment, the interpolymer is an EPDM terpolymer. In a further embodiment, the diene is ENB.

An ethylene/α-olefin/diene interpolymer, and further a terpolymer, may comprise a combination of two or more embodiments as described herein.

An ethylene/propylene/diene interpolymer, and further an EPDM terpolymer, may comprise a combination of two or more embodiments as described herein.

Ethylene/α-Olefin Multi-Block Interpolymers (Component B)

In one embodiment, the second polymer is an ethylene/α-olefin multi-block interpolymer, and further an ethylene/α-olefin multi-block copolymer. See above discussion on "Ethylene/α-Olefin Multi-Block Interpolymers (Component A)" for applicable embodiments, other than those discussed in this section.

In one embodiment, the ethylene/α-olefin multi-block interpolymer, and further copolymer, has a density of less than, or equal to, 0.867 g/cc, further less than, or equal to, 0.866 g/cc, further less than, or equal to, 0.865 g/cc.

In one embodiment, the ethylene/α-olefin multi-block interpolymer, and further copolymer, has a density greater than, or equal to, 0.850 g/cc, further greater than, or equal to, 0.855 g/cc, and further greater than, or equal to, 0.860 g/cc. Density is measured by the procedure of ASTM D-792-08.

In one embodiment, the ethylene/α-olefin multi-block interpolymer, and further copolymer, has a melting point of greater than 90° C., further greater than 100° C. The melting point is measured by Differential Scanning calorimetry (DSC) method described in U.S. Publication 2006/0199930 (WO 2005/090427), incorporated herein by reference.

In one embodiment, the ethylene/α-olefin multi-block interpolymer, and further copolymer, has a melt index (I2) greater than, or equal to, 0.1 g/10 min, further greater than, or equal to, 0.4 g/10 min, and further greater than, or equal to, 1 g/10 min, as determined using ASTM D-1238 (190° C., 2.16 kg load).

In one embodiment, the ethylene/α-olefin multi-block interpolymer, and further copolymer, has a melt index (I2) less than, or equal to, 20 g/10 min, further less than, or equal to, 10 g/10 min, and further less than, or equal to, 5 g/10 min, as determined using ASTM D-1238 (190° C., 2.16 kg load).

An ethylene/α-olefin multi-block interpolymer may comprise a combination of two or more embodiments as described herein.

An ethylene/α-olefin multi-block copolymer may comprise a combination of two or more embodiments as described herein.

Crosslinking Agents

Suitable crosslinking agents include, but are not limited to, peroxides. Peroxides include, but are not limited to, di-tert-butyl peroxide, tertbutylcumyl peroxide, dicumyl peroxide, 2,5-dimethyl-2,5-di-(tertbutylperoxy)hexane, di-(tertbutylperoxyisopropyl)benzene, tertbutyl peroxybenzoate, and 1,1-di-(tertbutylperoxy)-3,3,5-trimethylcyclohexane.

In one embodiment, the crosslinking agent is selected from peroxides.

In one embodiment, the crosslinking agent is present in an amount from 0.5 to 5.0 parts by weight, further from 0.5 to 1.0 parts by weight, based upon 100 parts of the polymers in the composition.

Crosslinking temperatures and time employed are typical. Temperatures ranging from about 120° C. to about 225° C., and times ranging from about one minute to about 60 minutes can be used.

A crosslinking agent may comprise a combination of two or more embodiments as described herein.

Foaming Agents

Foaming agents can be blends of two or more foaming agents. Foaming agents can be applied in both batch and continuous foaming processes. Foaming agents (i.e. blowing agent) used in the foam include, but are not limited to, physical blowing agent and chemical blowing agent.

Physical blowing agents include pentanes, hexanes, heptanes, benzene, toluene, dichloromethane, trichloromethane, trichloroethylene, tetra-chloromethane, 1,2-dichloroethane, trichlorofluoromethane, 1,1,2-trichlorotrifluoroethane, methanol, ethanol, 2-propanol, ethyl ether, isopropyl ether, acetone, methyl ethyl ketone, and methylene chloride; isobutene and n-butane, 1,1-difluoroethane. Chemical blowing agents include sodium bicarbonate, dinitrosopentamethylene-tetramine, sulfonyl hydrazides, azodicarbonamide, p-toluenesulfonyl semicarbazide, 5-phenyltetrazole, diisopropyl-hydrazodicarboxylate, 5-phenyl-3,6-dihydro-1,3,4-oxadiazin-2-one, and sodium borohydride.

Additives

In one embodiment, an inventive composition comprises at least one additive. Suitable additives include, but are not limited to, fillers, antioxidants, UV stabilizers, flame retardants, colorants or pigments, zinc oxide, stearic acid, zinc stearate, mold release agents, and combinations thereof.

In one embodiment, the composition comprises at least one filler. In a further embodiment, the filler is selected from carbon black, talc, calcium carbonate, clay or combinations thereof. In one embodiment, the filler is present in an amount less than, or equal to, 50 weight percent, further less than, or equal to, 20 weight percent, and further less than, or equal to, 10 weight percent, based on the weight of the composition. In one embodiment, the filler is present in an amount greater than, or equal to, 1 weight percent, further greater than, or equal to, 2 weight percent, and further greater than, or equal to, 5 weight percent based on the weight of the composition. In one embodiment, the filler is present in an amount from 1 to 50 weight percent, further from 2 to 20 weight percent, further from 5 to 10 weight percent, based on the weight of the composition.

Antioxidants include, but are not limited to, hindered phenols, bisphenols, and thiobisphenols; substituted hydroquinones; tris(alkylphenyl)phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine; hexahydro-1,3,5-tris-β-(3,5-di-t-butyl-4-hydroxyphenyl)propionyl-s-triazine; 2,4,6-tris(n-1,4-dimethylpentylphenylene-diamino)-1,3,5-triazine; and tris-(3,5-di-t-butyl-4-hydroxybenzyl)isocyanurate.

In one embodiment, the composition further comprises a polymer selected from such as propylene-ethylene copolymers, EPR, SEBS, SBS, EVA, LDPE, LLDPE, EAA, EEA, EMA, EBA, or EMAA. In a further embodiment, this polymer is present in an amount less than 20 weight percent, further less than 10 weight percent, and further less than 5 weight percent, based on the weight of the composition.

Applications

The invention also provides for an article comprising at least one component formed from an inventive composition. Articles include, but are not limited to extruded profiles, foams, weather strips, belts, hoses, wire and cable jacketing, tubes, flooring materials, gaskets, molded goods, sheets, and extruded parts. Additional articles include footwear components, sporting goods, automotive parts (for example, dashboards and window seals), computer parts, building materials, household appliances and toys.

Compositions may be formed into a finished article of manufacture by any one of a number of conventional processes and apparatus. Illustrative processes include, but are not limited to, extrusion, calendaring, injection molding, compression molding, and other typical processes known in the art. For example, articles can be prepared by injection molding, extrusion, extrusion followed by thermoforming, low pressure molding, compression molding, bun foam process, and the like.

The inventive compositions are ideally suited for footwear and sporting good applications, where good cushioning is required at a wide range of temperatures.

DEFINITIONS

Unless stated to the contrary, implicit from the context, or customary in the art, all parts and percents are based on weight, and all test methods are current as of the filing date of this disclosure.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term interpolymer as defined hereinafter. Trace amounts of impurities, for example, catalyst residues, may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and at least one α-olefin. As used in the context of this disclosure, ethylene/α-olefin interpolymer excludes ethylene/α-olefin multi-block interpolymers.

The term, "ethylene/α-olefin copolymer," as used herein, refers to a copolymer that comprises, in polymerized form, a majority amount of ethylene monomer (based on the weight of the copolymer), and an α-olefin, as the only two monomer types. As used in the context of this disclosure, ethylene/α-olefin copolymer excludes ethylene/α-olefin multi-block copolymers.

The term, "propylene-based polymer," as used herein, refers to a polymer that comprises, in polymerized form, a majority amount of propylene monomer (based on the weight of the polymer), and optionally may comprise one or more comonomers.

The term, "propylene/α-olefin interpolymer," as used herein, refers to an interpolymer that comprises, in polymerized form, a majority amount of propylene monomer (based on the weight of the interpolymer), and at least one α-olefin.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene interpolymer," as used herein, refers to an interpolymer that comprises, in polymerized form, a majority amount of propylene monomer (based on the weight of the interpolymer), and ethylene.

The term, "propylene/ethylene copolymer," as used herein, refers to a copolymer that comprises, in polymerized form, a majority amount of propylene monomer (based on the weight of the copolymer), and ethylene, as the only two monomer types.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density

Polymer density was measured in accordance with ASTM D-792.

Melt Index

Melt index (I2) of an ethylene-based polymer is measured in accordance with ASTM D-1238, condition 190° C./2.16 kg. Melt index (I5) of an ethylene-based polymer is measured in accordance with ASTM D-1238, condition 190° C./5.0 kg. Melt index (I10) of an ethylene-based polymer is measured in accordance with ASTM D-1238, condition 190° C./10.0 kg. High load melt index (I21) of an ethylene-based polymer is measured in accordance with ASTM D-1238, condition 190° C./21.0 kg. For propylene-based polymers, the melt flow rate (MFR) is measured in accordance with ASTM D-1238, condition 230° C./2.16 kg.

Differential Scanning Calorimetry (DSC)

Differential Scanning calorimetry (DSC) is used to measure crystallinity in ethylene-based (PE) samples and propylene-based (PP) samples. About 5 to 8 mg of film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve, and the crystallization temperature ($T_c$) is determined from the first cooling curve.

Mooney Viscosity of Polymer

Polymer Mooney Viscosity (ML1+4 at 125° C.) is measured in accordance with ASTM 1646-04, with a one minute preheat time and a four minute rotor operation time. The instrument is an Alpha Technologies Rheometer MDR 2000.

Gel Permeation Chromatography

The chromatographic system consisted of either a Polymer Laboratories Model PL-210 or a Polymer Laboratories Model PL-220. The column and carousel compartments were operated at 140° C. The columns were three Polymer Laboratories, 10-micron Mixed-B columns. The solvent used was 1,2,4 trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute.

Calibration of the GPC column set was performed with 21 "narrow molecular weight distribution polystyrene standards," with molecular weights ranging from 580 to 8,400,000, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: $M_{polyethylene} = A \times (M_{polystyrene})^B$, where M is the molecular weight, A has a value of 0.431 and B is equal to 1.0 (as described in Williams and Ward, J. Polym. Sc., Polym. Let., 6, 621 (1968)). Polyethylene equivalent molecular weight calculations were performed using Viscotek TriSEC software Version 3.0.

Compression Set

Compression Set (CS) was measured on the foam sample according to ASTM D395 The Compression Set was calculated as the percentage of the original deflection, measured after the material was allowed to recover at standard conditions for 30 minutes. Percent Compression Set was calculated using the formula: $C=[(h_0-h_t)/(h_0-h_n)] \times 100$, where $h_0$ is the original specimen thickness, $h_t$ is the specimen thickness after testing, and $h_n$ is the spacer thickness.

Mechanical Properties

Tensile and elongation were measured in accordance with ASTM D412, using phylon foam. Tear strength and split tear were measured in accordance with ASTM D624 and BS 5131, respectively, using phylon foam.

Hardness

Hardness of the foam was measured in accordance with ASTM D2240, using phylon foam.

Rebound
Rebound of the foam was measured in accordance with ASTM D2632, using phylon foam.

Foam Density
Density of the foam was measured in accordance with ASTM D297, using phylon foam.

Shrinkage
Shrinkage was measure on a foam specimen with dimension of "10 cm by 10 cm by 10 mm" Two lines with a length of 10 cm were diagonally drawn on the foam specimen prior placing into the oven. The specimens were placed in an oven at 70° C. for 40 minutes. Then the foams were taken out of the oven, and placed on a rack to cool under constant humidity and temperature (23° C., 50% relative humidity) for 30 minutes. The lines were measured again, and the percent the shrinkage was determined as follows: Shrinkage (%)=(initial length−final length)/(initial length)×100%

The following examples illustrate, but do not, either explicitly or by implication, limit the present invention.

EXPERIMENTAL

Components used in the compositions of this study are shown in Table 1 below, and the compositions are shown in Table 2 below.

TABLE 1

| Components | | | | |
|---|---|---|---|---|
| Components | Suppliers | Density (g/cc) | I2 (g/10 min) | Tm (° C.) |
| ENGAGE 8440 | Dow Chemical Company | 0.897 | 1.6 | 93 |
| INFUSE 9530 | Dow Chemical Company | 0.887 | 5 | 119 |
| INFUSE 9107 | Dow Chemical Company | 0.866 | 1 | 121 |
| ENGAGE 8180 | Dow Chemical Company | 0.863 | 0.5 | 47 |
| NORDEL IP 3430* | Dow Chemical Company | 0.86 | | |
| Zinc oxide | Aldrich | | | |
| Stearic acid | | | | |
| Zinc Stearate | | | | |
| Dicumyl peroxide | AKZO NOBEL | | | |
| CaCO3 | | | | |
| AA110 (azodicarbonamide) | TAIHSIN Chemical Ind. Co. Ltd | | | |

*Mooney Viscosity = 27 (ML 1 + 4 at 125° C.)

TABLE 2

| Compositions | | | | | |
|---|---|---|---|---|---|
| Formulation (phr, based on sum weight of polymer components) | Example 1 | Example 2 | Example 3 | Example 4 | Example 5 |
| ENGAGE 8440 | 70 | 70 | 70 | 0 | 0 |
| INFUSE 9530 | 0 | 0 | 0 | 40 | 70 |
| INFUSE 9107 | 30 | 0 | 0 | 0 | 0 |
| ENGAGE 8180 | 0 | 30 | 0 | 0 | 0 |
| NORDEL IP 3430 | 0 | 0 | 30 | 60 | 30 |
| Zinc oxide | 1.5 | 1.5 | 1.5 | 1.5 | 1.5 |
| Stearic acid | 0.5 | 0.5 | 0.5 | 0.5 | 0.5 |
| Zinc Stearate | 1 | 1 | 1 | 1 | 1 |
| Dicumyl peroxide | 0.85 | 0.85 | 0.85 | 0.85 | 0.85 |
| CaCO3 | 5 | 5 | 5 | 5 | 5 |
| AA110 (azodicarbonamide) | 3.1 | 3.1 | 3.1 | 3.1 | 3.1 |

Foams

Polymer components were compounded with other additives, foaming agents, etc. (formulations shown in Table 2), using an internal kneader. The resulted compounds were converted into foams by compression molding at mold temperature of 160° C. The foamed material was cooled, and cut into required shape (known as perform). The pre-form was compressed in a mold to about ⅔ of its original size in a heated mold. After heating, the mold was cooled to room temperature, where the foam sets its shape. Properties of the foams are shown in Table 3.

TABLE 3

| Formulation (phr) | Test Method | Example 1 | Example 2 | Example 3 | Example 4 | Example 5 |
|---|---|---|---|---|---|---|
| Asker C (skin on) | ASTM D2240 | 54~55 | 55~56 | 59~60 | 52~53 | 53~54 |
| Density (g/cm3) | ASTM D297 | 0.2001 | 0.2195 | 0.3193 | 0.3785 | 0.2662 |
| Tensile [kg/cm2] | ASTM D412 | 45.8 | 47.2 | 32.4 | 23.9 | 26.8 |
| Elongation [%] | ASTM D412 | 304.2 | 299.2 | 298.8 | 377.6 | 296.5 |
| Type C Tear [kg/cm] | ASTM D624 | 19.2 | 18.1 | 15.5 | 11.4 | 13.1 |
| Split Tear [kg/cm] | BS 5131 | 3.6 | 3.4 | 3.4 | 2.3 | 2.3 |
| Rebound (%) | ASTM D2632 | 46 | 48 | 51 | 61 | 56 |
| Comp Set 50%, 50° C./6 hr (%) | ASTM D395 | 31.1 | 28.1 | 19.1 | 9.6 | 23.6 |
| Shrinkage, 40 min, 70° C. (%) | | 0.69 | 0.25 | 1.18 | 0.69 | 0.69 |

Comparative Foams

Comparative foams formed from PU and EVA, and used for midsole applications, are shown in Table 4 below.

TABLE 4

Comparative Foams

| Properties | Test Method | Comparative Ex. A (EVA) | Comparative Ex. B (PU) |
|---|---|---|---|
| Asker Skin (skin on) | ASTM D2240 | 51-53 | 55-57 |
| Density (g/cc) | ASTM D297 | 0.24 | 0.35 |
| Tensile (kg/cm$^2$) | ASTM D412 | 29.8 | 41.1 |
| Elongation (%) | ASTM D412 | 323 | 341 |
| Tear Strength (kg/cm) | ASTM D624 | 11.4 | 12.9 |
| Split Tear (kg/cm) | BS 5131 | 3.1 | 2.9 |
| Rebound (%) | ASTM D2632 | 54 | 31 |
| Compression Set 50%, 50° C./6 h [%] | ASTM D395 | 57.6 | 11.1 |
| Shrinkage 40 min, 70° C. [%] | | 4.1 | 0 |

Applicants have unexpectedly discovered that their inventive compositions generate foams that have better "consistent temperature behavior," as compared to incumbent EVA and PU foams. FIG. 1 shows dynamic properties of both the comparative and inventive foams analyzed using a "T.A. RSA III Rheometer," equipped with "25 mm parallel plates," in compressive mode. The test conditions were −20° C. to 60° C., at 2° C./min, 1 hertz. The profiles in FIG. 1 show that storage modulus, E' of all the inventive foams remain relatively constant from −20° C. to 35° C. For the inventive Examples 4 and 5 there is no significant change in the E' value with temperature. For Inventive Examples 4, the ratio of the storage modulus at −20° C., E' (−20° C.), to the storage modulus at 35° C., E'(−35° C.), is in not more than 1:1. The inventive examples (foams) had less, or no change in, stiffness/hardness, as compared to the EVA foams. The profiles of FIG. 1 also show that the E' value of the PU foam increases dramatically with decreasing temperature, as compared to the inventive foams. As seen from Tables 3 and 4, Inventive Example 5 had an overall better balance of properties (i.e. good resilience (Rebound) and excellent compression set) compared to Comparative Examples 1 and 2.

The inventive foams had more consistent temperature behavior than the incumbent EVA and PU foams. Compared to the EVA-based foam, the inventive foams better compression set (below 35%), at comparable foam densities. Compared to the PU-based foam, the inventive foams have better resilience at comparable densities. The inventive foams are also more cost effective to produce, have better hydrolysis resistant, and better recyclability compared to the PU-based foam.

It has been discovered that the inventive compositions generate foams with consistent dynamic properties over a broad range of temperature, and an elastic relaxation (measured as compression set @ 50 C) lower than 40%, which makes these compositions better than the incumbent EVA- and PU-based foams that are subject to greater temperature extremes. These properties features lead to improved foams with improved durability, cushioning and comfort. The inventive compositions are especially suitable for use in footwear and sporting good applications, and other applications that require good cushioning effect in cold environments.

The invention claimed is:

1. A composition comprising the following:
   A) a first polymer selected from the following:
      i) an ethylene/α-olefin interpolymer; or
      ii) an ethylene/α-olefin multi-block interpolymer;
   B) a second polymer selected from the following:
      iii) an ethylene/α-olefin interpolymer;
      iv) an ethylene/α-olefin/non-conjugated diene interpolymer; or
      v) an ethylene/α-olefin multi-block interpolymer; and
   wherein the first polymer has a density from 0.880 to 0.910 g/cc, and
   the second polymer has a density less than, or equal to, 0.867 g/cc, and
   wherein the weight ratio of the first polymer to the second polymer is from 0.5 to 9.

2. The composition of claim 1, wherein the first polymer has a melting temperature (Tm) greater than 70° C., as determined by DSC.

3. The composition of claim 1, wherein the first polymer has a melting temperature (Tm) less than 130° C., as determined by DSC.

4. The composition of claim 1, wherein the first polymer has a molecular weight distribution (Mw/Mn) from 1.2 to 3.

5. The composition of claim 1, wherein the first polymer is i) an ethylene/α-olefin interpolymer.

6. The composition of claim 5, wherein the first polymer is a homogeneously branched linear ethylene/α-olefin interpolymer, or a homogeneously branched substantially linear ethylene/α-olefin interpolymer.

7. The composition of claim 1, wherein the first polymer is ii) an olefin block interpolymer.

8. The composition of claim 1, wherein the second polymer has a molecular weight distribution (Mw/Mn) from 1.2 to 3.

9. The composition of claim 1, wherein the second polymer is iii) an ethylene/α-olefin interpolymer.

10. The composition of claim 9, wherein the ethylene/α-olefin interpolymer is a homogeneously branched linear ethylene/α-olefin interpolymer, or a homogeneously branched substantially linear ethylene/α-olefin interpolymer.

11. The composition of claim 1, wherein the second polymer is iv) an ethylene/α-olefin/non-conjugated diene interpolymer.

12. The composition of claim 11, wherein the ethylene/α-olefin/non-conjugated diene interpolymer has a Mooney Viscosity (ML 1+4) at 125° C., from 5 to 70.

13. The composition of claim 1, wherein the composition further comprises a free radical agent and a foaming agent.

14. A foam formed from the composition of claim 1.

15. An article comprising at least one component formed from the composition of claim 1.

* * * * *

UNITED STATES PATENT AND TRADEMARK OFFICE
CERTIFICATE OF CORRECTION

PATENT NO. : 9,249,271 B2
APPLICATION NO. : 14/419541
DATED : February 2, 2016
INVENTOR(S) : Bee Tin Low It is certified that error appears in the above-identified patent and that said Letters Patent is hereby corrected as shown below:

In the Claims

Column 24, line 10, delete "ethylene/α-olefin interpolymer" and insert --ethylene/α-olefin copolymer--

Column 24, line 32, delete "ethylene/α-olefin interpolymer" and insert --ethylene/α-olefin copolymer--

Column 24, line 34, delete "ethylene/α-olefin interpolymer" and insert --ethylene/α-olefin copolymer--

Column 24, line 36, delete "ethylene/α-olefin interpolymer" and insert --ethylene/α-olefin copolymer--

Signed and Sealed this
Twenty-sixth Day of July, 2016

Michelle K. Lee
*Director of the United States Patent and Trademark Office*